United States Patent
Ichikawa

(10) Patent No.: US 9,721,722 B2
(45) Date of Patent: Aug. 1, 2017

(54) POWER RECEPTION DEVICE, VEHICLE INCLUDING POWER RECEPTION DEVICE, AND POWER TRANSFER SYSTEM

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 569 days.

(21) Appl. No.: 14/349,129

(22) PCT Filed: Oct. 7, 2011

(86) PCT No.: PCT/JP2011/073204
§ 371 (c)(1),
(2), (4) Date: Apr. 2, 2014

(87) PCT Pub. No.: WO2013/051150
PCT Pub. Date: Apr. 11, 2013

(65) Prior Publication Data
US 2014/0246901 A1    Sep. 4, 2014

(51) Int. Cl.
*B60L 1/00* (2006.01)
*B60L 5/00* (2006.01)
(Continued)

(52) U.S. Cl.
CPC .............. *H01F 38/14* (2013.01); *B60L 1/003* (2013.01); *B60L 1/08* (2013.01); *B60L 5/005* (2013.01);
(Continued)

(58) Field of Classification Search
CPC .. B60L 1/003; B60L 1/08; B60L 5/005; B60L 11/1809; B60L 11/1811; B60L 11/1812; B60L 11/182; B60L 11/1829; B60L 11/1831; B60L 2210/40; B60L 2240/36; B60L 2240/525; H01F 38/14; H02J 5/00; H02J 5/005; H02J 7/025; H02J 17/00; H02J 50/00; H02J 50/05; H02J 50/10; H02J 50/12; H04B 5/0037; H04B 5/0075; H04B 5/0081; H04B 5/0087; H04B 5/0093; Y02T 10/7005; Y02T 10/7072;
(Continued)

(56) References Cited

U.S. PATENT DOCUMENTS 5,573,090 A    11/1996    Ross
5,991,665 A    11/1999    Wang et al.
(Continued)

FOREIGN PATENT DOCUMENTS

AU    2006269374 B2    1/2007
AU    2006269374 C1    1/2007
(Continued)

*Primary Examiner* — Levi Gannon
(74) *Attorney, Agent, or Firm* — Oliff PLC

(57) ABSTRACT

A vehicle includes a power reception unit, a rectifier, a power line, and a cooling fan. The power reception unit of the vehicle is configured to receive, in a contactless manner, AC power output from a power transmission unit of a power transmission device. The rectifier rectifies the electric power received by the power reception unit. The electric power rectified by the rectifier is output through the power line. The cooling fan cools the power reception unit. The cooling fan is electrically connected to the power line, and operates with the electric power received from the power line.

17 Claims, 11 Drawing Sheets

(51) Int. Cl.
*B60L 11/18* (2006.01)
*H01F 38/14* (2006.01)
*H02J 7/02* (2016.01)
*H02J 50/10* (2016.01)
*H02J 5/00* (2016.01)
*B60L 1/08* (2006.01)

(52) U.S. Cl.
CPC ............ *B60L 11/182* (2013.01); *H02J 5/005* (2013.01); *H02J 7/025* (2013.01); *H02J 50/10* (2016.02); *B60L 2210/40* (2013.01); *B60L 2240/36* (2013.01); *B60L 2240/525* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01)

(58) Field of Classification Search
CPC ... Y02T 10/7241; Y02T 90/10; Y02T 90/122; Y02T 90/127
USPC .......................................... 307/9.1, 10.1, 104
See application file for complete search history.

(56) References Cited

U.S. PATENT DOCUMENTS

| | | | |
|---|---|---|---|
| 6,351,098 B1 | 2/2002 | Kaneko | |
| 7,741,734 B2 | 6/2010 | Joannopoulos et al. | |
| 8,629,577 B2* | 1/2014 | Azancot | H01F 38/14 307/104 |
| 2007/0222542 A1 | 9/2007 | Joannopoulos et al. | |
| 2008/0197957 A1* | 8/2008 | Kondo | H01F 5/04 336/90 |
| 2008/0278264 A1 | 11/2008 | Karalis et al. | |
| 2009/0184679 A1 | 7/2009 | Yeh | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0164458 A1 | 7/2010 | Pollard | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0219183 A1* | 9/2010 | Azancot | H02J 5/005 219/676 |
| 2010/0224725 A1 | 9/2010 | Perlman et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0231029 A1* | 9/2011 | Ichikawa | B60L 11/123 700/298 |
| 2011/0254376 A1* | 10/2011 | Sasaki | B60L 5/005 307/104 |
| 2012/0161541 A1* | 6/2012 | Urano | H05B 33/0857 307/104 |

FOREIGN PATENT DOCUMENTS

| | | | |
|---|---|---|---|
| AU | 2007349874 A2 | 10/2008 | |
| AU | 2010200044 A1 | 1/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101860089 A | 10/2010 | |
| EP | 1 902 505 A2 | 3/2008 | |
| EP | 2 130 287 A1 | 12/2009 | |
| EP | 2 538 573 A2 | 12/2012 | |
| IN | 735/DELNP/2008 | 5/2008 | |
| IN | 6195/DELNP/2009 | 7/2010 | |
| JP | 2007-064557 A | 3/2007 | |
| JP | A-2009-501510 | 1/2009 | |
| JP | A-2010-268660 | 11/2010 | |
| KR | 2008-0031398 A | 4/2008 | |
| KR | 2010-0015954 A | 2/2010 | |
| WO | WO 2007/008646 A2 | 1/2007 | |
| WO | WO 2008/118178 A1 | 10/2008 | |
| WO | 2010/106648 A1 | 9/2010 | |
| WO | WO 2010/106648 * | 9/2010 | ............ H02J 17/00 |
| WO | WO 2011/036659 A2 | 3/2011 | |
| WO | 2011/117714 A2 | 9/2011 | |
| WO | WO 2013/049065 A1 | 4/2013 | |

* cited by examiner

POWER RECEPTION DEVICE, VEHICLE INCLUDING POWER RECEPTION DEVICE, AND POWER TRANSFER SYSTEM

TECHNICAL FIELD

The present invention relates to a power reception device receiving electric power from a power transmission device in a contactless manner, a vehicle including the power reception device, and a power transfer system.

BACKGROUND ART

Great attention has been paid to wireless power transfer by which a power supply cord and a power transmission cable are not used. Three techniques are known as this wireless power transfer technique, namely power transmission by means of electromagnetic induction, power transmission by means of microwaves and so-called resonance-type power transmission.

For example, Japanese Patent Laying-Open No. 2010-268660 (PTD 1) discloses a contactless power transmission device utilizing a resonance-type power transfer technique. This contactless power transmission device includes a secondary resonant coil receiving, in a contactless manner, electric power output from a primary resonant coil of a power transmission device, and a cooling device cooling a secondary resonant coil.

According to this contactless power transmission device, the secondary resonant coil is cooled by the cooling device, thereby allowing suppression of impedance change in the secondary resonant coil, with the result that the power transfer efficiency can be improved (see PTD 1).

CITATION LIST

Patent Document

PTD 1: Japanese Patent Laying-Open No. 2010-268660

SUMMARY OF INVENTION

Technical Problem

According to the above-described wireless power transfer technique, high-frequency alternating-current (AC) power (for example, in the order of kHz or higher) is transmitted from a power transmission device to a power reception device. Accordingly, when an auxiliary machinery power supply of the vehicle is used for a power supply of the above-mentioned cooling device disposed in proximity to the secondary resonant coil, a harmonic of the electric power received by the secondary resonant coil may be superimposed on a power supply line of the cooling device, and propagated as noise to auxiliary machinery and an electronic device that receive electric power from the auxiliary machinery power supply.

Therefore, an object of the present invention is to provide a power reception device receiving electric power from a power transmission device in a contactless manner, for the purpose of suppressing that noise generated by the electric power received from the power transmission device exerts an influence upon other devices.

Solution to Problem

According to the present invention, a power reception device receives electric power from a power transmission device in a contactless manner, and includes a power reception unit, a power line and an electrical device. The power reception unit is configured to receive, in a contactless manner, AC power output from a power transmission unit of the power transmission device. The electric power received by the power reception unit is output through the power line. The electrical device is disposed in proximity to the power reception unit and operates with the electric power received through the power line.

Preferably, the power reception device further includes a shield box. The shield box houses the power reception unit. Also, the electrical device is disposed within the shield box.

Further preferably, the electrical device is electrically connected to the power line within the shield box.

Preferably, the power reception device further includes a rectification unit and a voltage conversion unit. The rectification unit rectifies the electric power received by the power reception unit. The voltage conversion unit performs voltage conversion of the electric power rectified by the rectification unit, and outputs the electric power to a load. Also, the electrical device is electrically connected between the rectification unit and the voltage conversion unit.

Further preferably, the electrical device includes a cooler for cooling the power reception unit. The power reception device further includes a voltage control unit. The voltage control unit controls the voltage conversion unit such that a voltage between the rectification unit and the voltage conversion unit is equal to a target voltage that is set to be higher as the electric power received by the power reception unit is larger.

Preferably, the power reception device further includes a rectification unit. The rectification unit rectifies the electric power received by the power reception unit. Also, the electrical device is electrically connected between the power reception unit and the rectification unit.

Preferably, a difference between a natural frequency of the power reception unit and a natural frequency of the power transmission unit is equal to or less than ±10% of the natural frequency of the power reception unit or the natural frequency of the power transmission unit.

Preferably, a coupling coefficient between the power reception unit and the power transmission unit is equal to or less than 0.1.

Preferably, the power reception unit receives electric power from the power transmission unit through at least one of a magnetic field formed between the power reception unit and the power transmission unit and oscillating at a specific frequency, and an electric field formed between the power reception unit and the power transmission unit and oscillating at a specific frequency.

Furthermore, according to the present invention, a vehicle includes the power reception device described in any of the above.

According to the present invention, a power transfer system serves to transfer electric power from a power transmission device to a power reception device in a contactless manner. The power transmission device includes a power supply unit and a power transmission unit. The power supply unit generates AC power. The power transmission unit is configured to output the AC power to the power reception device in a contactless manner, the AC power being supplied from the power supply unit. The power reception device includes a power reception unit, a power line and an electrical device. The power reception unit is configured to receive, in a contactless manner, the AC power output from the power transmission unit. The electric power rectified by the power reception unit is output through the power line. The electrical device is disposed in proximity to the power reception unit and operates with the electric power received through the power line.

Advantageous Effects of Invention

According to the present invention, the electrical device disposed in proximity to the power reception unit operates with electric power received from the power line through which the electric power received by the power reception unit is output. Accordingly, it is suppressed that a harmonic of the electric power received by the power reception unit is propagated from the electrical device to the auxiliary machinery power supply. Therefore, according to the present invention, in the power reception device receiving electric power from the power transmission device in a contactless manner, it can be suppressed that noise generated by the electric power received from the power transmission device exerts an influence upon other devices.

DESCRIPTION OF EMBODIMENTS

Figure 1:
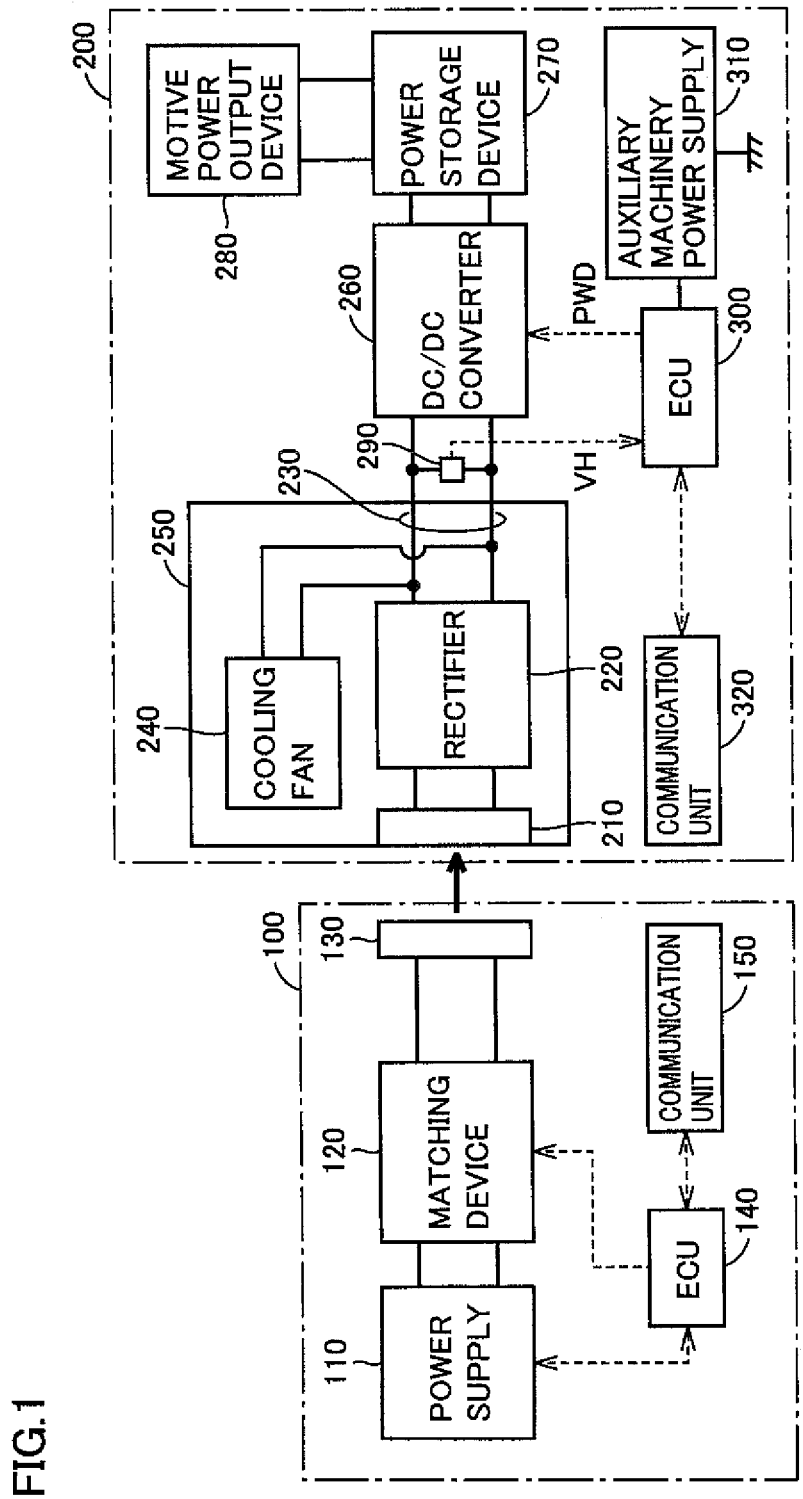
FIG. 1 is an entire configuration diagram of a power transfer system according to the first embodiment of the present invention.

Embodiments of the present invention will be hereinafter described in detail with reference to the drawings, in which the same or corresponding components are designated by the same reference characters, and description thereof will not be repeated.

First Embodiment

FIG. 1 is an entire configuration diagram of a power transfer system according to the first embodiment of the present invention. Referring to FIG. 1, this power transfer system includes a power transmission device 100 and a vehicle 200 as a power reception device.

Power transmission device 100 includes a power supply unit 110, a matching device 120, a power transmission unit 130, an electronic control unit (which will be hereinafter referred to as an "ECU") 140, and a communication unit 150. Power supply unit 110 generates AC power having a prescribed frequency. By way of example, power supply unit 110 receives electric power from a system power supply that is not shown to generate high-frequency AC power. Then, according to a command received from ECU 140, power supply unit 110 controls electric power generation and discontinuation thereof, and the output electric power.

Matching device 120 is provided between power supply unit 110 and power transmission unit 130, and configured to be capable of changing its internal impedance. By way of example, matching device 120 is formed of a variable capacitor and a coil, and can change the impedance by changing the capacitance of the variable capacitor. By changing the impedance in this matching device 120, the impedance of power transmission device 100 can be matched with the impedance of vehicle 200 (impedance matching).

Power transmission unit 130 receives supply of high-frequency AC power from power supply unit 110. Then, power transmission unit 130 outputs electric power to power reception unit 210 of vehicle 200 in a contactless manner through the electromagnetic field generated around power transmission unit 130. In addition, the configuration of power transmission unit 130, and power transfer from power transmission unit 130 to power reception unit 210 will be described later.

ECU 140 controls power supply unit 110 and matching device 120 by software processing by the CPU (Central Processing Unit) executing the program stored in advance and/or by hardware processing by a dedicated electronic circuit. Communication unit 150 is a communication interface for communication to be performed between power transmission device 100 and vehicle 200.

Vehicle 200 includes a power reception unit 210, a rectifier 220, a power line 230, a cooling fan 240 as an example of an "electrical device" in the present invention, and a shield box 250. Vehicle 200 further includes a DC/DC converter 260, a power storage device 270, a motive power output device 280, a voltage sensor 290, an ECU 300, an auxiliary machinery power supply 310, and a communication unit 320. Power reception unit 210 receives high-frequency AC power, which is output from power transmission unit 130 of power transmission device 100, through an electromagnetic field in a contactless manner. In addition, the configuration of this power reception unit 210 will also be described later together with the configuration of power transmission unit 130, and power transfer from power transmission unit 130 to power reception unit 210. Rectifier 220 rectifies the AC power received by power reception unit 210. The electric power rectified by rectifier 220 is output to power line 230.

Cooling fan 240 is disposed in proximity to power reception unit 210 and cools this power reception unit 210. The term "in proximity to power reception unit 210" used herein means that cooling fan 240 strongly receives harmonic noise of the received electric power from power reception unit 210. It can be said that cooling fan 240 housed within shield box 250 together with power reception unit 210 is disposed in proximity to power reception unit 210, as described below. Furthermore, cooling fan 240 is electrically connected to power line 230 through which the received electric power rectified by rectifier 220 is output, and operates with the electric power received from power line 230.

Shield box 250 houses power reception unit 210, rectifier 220 and cooling fan 240, and suppresses that the electromagnetic wave generated around power reception unit 210 is leaked to the surroundings. In addition, it is preferable that cooling fan 240 is electrically connected to power line 230 within shield box 250 as shown in the figure. Cooling fan 240 can also be electrically connected to power line 230 on the outside of shield box 250, which however requires shield box 250 to have a wiring hole.

Voltage sensor 290 detects a voltage VH on power line 230, and outputs the detection value to ECU 300. DC/DC converter 260 is provided between power line 230 and power storage device 270, converts the electric power output from rectifier 220 through power line 230 into the voltage level of power storage device 270, and outputs the resultant to power storage device 270.

Power storage device 270 is a rechargeable DC power supply and is configured of a secondary battery such as a lithium-ion battery or a nickel-metal hydride battery, for example. Power storage device 270 stores electric power supplied from DC/DC converter 260 and also stores regenerative electric power generated by motive power output device 280. Then, power storage device 270 supplies the stored electric power to motive power output device 280. It is to be noted that a large capacity capacitor can also be employed as power storage device 270.

Motive power output device 280 generates driving power for running of vehicle 200 using the electric power stored in power storage device 270. Although not particularly shown, motive power output device 280 includes an inverter receiving electric power from power storage device 270, a motor driven by the inverter, driving wheels driven by the motor, and the like. In addition, motive power output device 280 may also include a power generator for charging power storage device 270 and an engine capable of driving the power generator.

ECU 300 receives voltage VH on power line 230 from voltage sensor 290. Then, ECU 300 carries out control of DC/DC converter 260, charging management of power storage device 270, and the like by software processing by the CPU executing the program stored in advance and/or by hardware processing by a dedicated electronic circuit. This ECU 300 operates with the electric power received from auxiliary machinery power supply 310. It is to be noted that ECU 300 can wirelessly communicate with power transmission device 100 by communication unit 320.

Auxiliary machinery power supply 310 supplies electric power to various auxiliary machineries (not shown) and ECU 300 that are mounted in vehicle 200. Auxiliary machinery power supply 310 is formed, for example, of a secondary battery such as a lithium-ion, nickel-metal hydride or lead secondary battery. Communication unit 320 serves as a communication interface for vehicle 200 to communicate with power transmission device 100.

In this power transfer system, cooling fan 240 for cooling power reception unit 210 is provided. Cooling fan 240 is disposed in proximity to power reception unit 210, electrically connected to power line 230, and operates with the electric power received from power line 230. Specifically, while cooling fan 240 receives harmonic noise of the received electric power from power reception unit 210 since it is disposed within shield box 250 together with power reception unit 210, this cooling fan 240 operates not with the electric power received from auxiliary machinery power supply 310 supplying electric power to each auxiliary machinery and ECU mounted in vehicle 200, but with the electric power received from power line 230 through which the electric power received by power reception unit 210 is output. Accordingly, during power reception of power reception unit 210, it is suppressed that noise superimposed on cooling fan 240 is propagated to auxiliary machinery power supply 310 through the power supply line while power reception unit 210 is cooled by cooling fan 240.

Figure 2:
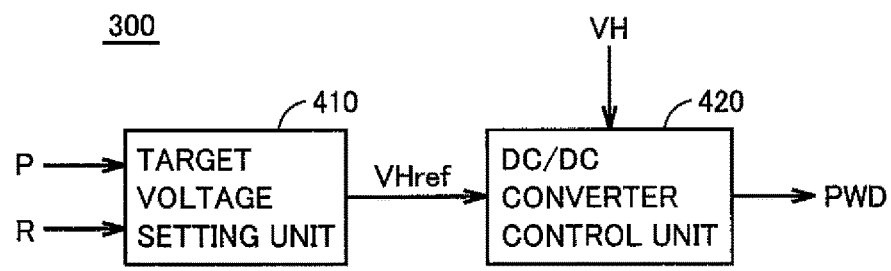
FIG. 2 is a functional block diagram related to control of a DC/DC converter by an ECU of a vehicle shown in FIG. 1.

FIG. 2 is a functional block diagram related to control of a DC/DC converter 260 by ECU 300 of vehicle 200 shown in FIG. 1. Referring to FIG. 2, ECU 300 includes a target voltage setting unit 410 and a DC/DC converter control unit 420. Target voltage setting unit 410 sets a target voltage VHref on power line 230 (FIG. 1) according to the following equation based on a target value P of the electric power transferred from power transmission device 100 to vehicle 200 and a target impedance R of vehicle 200.

$$VHref = \sqrt{(P \times R)} \qquad (1)$$

When DC/DC converter 260 controls the voltage on power line 230 through which received electric power is output so as to reach the above-mentioned target voltage VHref, the impedance of vehicle 200 can be set at target impedance R without depending on the magnitude of the electric power transferred from power transmission device 100 to vehicle 200. Then, in power transmission device 100, matching device 120 (FIG. 1) is used to adjust the impedance of power transmission device 100 at the above-mentioned impedance R, thereby allowing impedance matching between power transmission device 100 and vehicle 200.

DC/DC converter control unit 420 generates a PWM (Pulse Width Modulation) signal for driving DC/DC converter 260 such that voltage VH detected by voltage sensor 290 (FIG. 1) is equal to the above-mentioned target voltage VHref, and outputs the generated PWM signal to DC/DC converter 260 as a signal PWD.

In this way, according to this first embodiment, DC/DC converter 260 is controlled by ECU 300 in vehicle 200 to adjust voltage VH on power line 230 at target voltage VHref shown in the equation (1). As shown in the equation (1), the larger the electric power transferred from power transmission device 100 to vehicle 200 is, that is, the larger the electric power received in vehicle 200 is, the higher voltage VH on power line 230 is adjusted.

In this case, since cooling fan 240 for cooling power reception unit 210 receives operating electric power from power line 230, the power of cooling fan 240 is automatically increased as the electric power received by power reception unit 210 is larger. In this way, since the power of cooling fan 240 changes independently in accordance with the magnitude of the electric power transferred from power transmission device 100 to vehicle 200, power reception unit 210 can be effectively cooled by cooling fan 240 without having to provide any special control and mechanism for adjusting the power of cooling fan 240.

Figure 3:
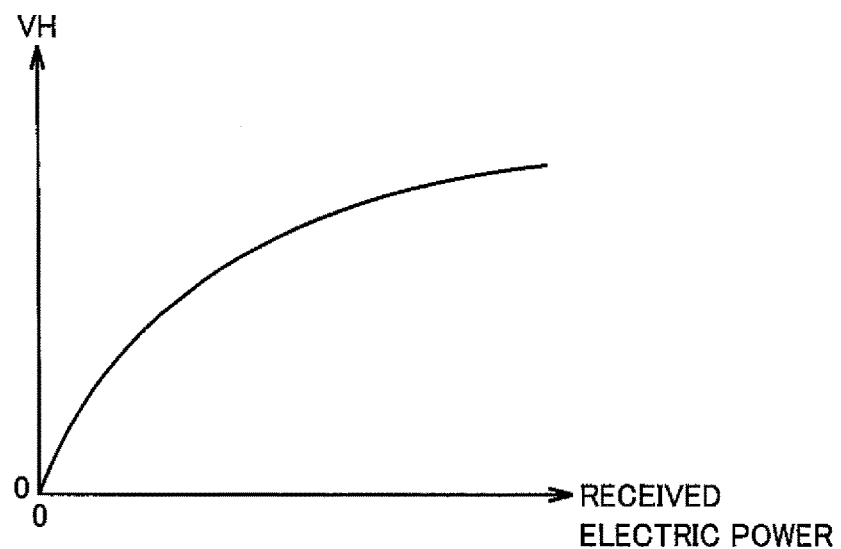
FIG. 3 is a diagram showing the relation between the electric power received by a power reception unit and the voltage on a power line.
Figure 4:
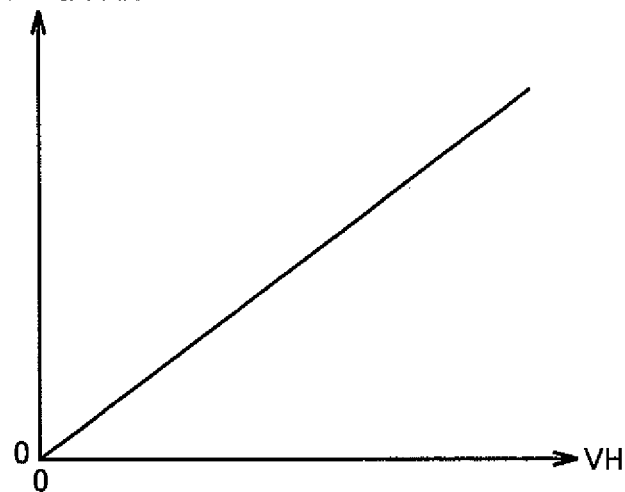
FIG. 4 is a diagram showing the relation between the voltage on the power line and the power of a cooling fan.

FIG. 3 is a diagram showing the relation between the electric power received by power reception unit 210 and voltage VH on power line 230. Also, FIG. 4 is a diagram showing the relation between voltage VH on power line 230 and the power of cooling fan 240.

Referring to FIG. 3, as the electric power received by power reception unit 210 is larger, target voltage VHref on power line 230 is set at a higher value according to the equation (1), with the result that voltage VH is adjusted at a higher value. Then, referring to FIG. 4, the higher the voltage VH on power line 230 is, the larger the power of cooling fan 240 cooling power reception unit 210 is. In this way, the larger the electric power received by power reception unit 210 is, the larger the power of cooling fan 240 is.

Then, power transfer from power transmission device 100 to vehicle 200 will be hereinafter described. Again referring to FIG. 1, in this power transfer system, the difference between the natural frequency of power transmission unit 130 and the natural frequency of power reception unit 210 is equal to or less than ±10% of the natural frequency of power transmission unit 130 or the natural frequency of power reception unit 210. By setting the natural frequencies of power transmission unit 130 and power reception unit 210 so as to fall within such a range, the power transfer efficiency can be improved. On the other hand, when the above-mentioned difference between the natural frequencies is greater than ±10%, the power transfer efficiency becomes lower than 10%, which may cause a harmful effect such as lengthened power transfer time.

It is to be noted that the natural frequency of power transmission unit 130 (power reception unit 210) means an oscillation frequency in case where an electric circuit (a resonance circuit) forming power transmission unit 130 (power reception unit 210) freely oscillates. Also, the resonance frequency of power transmission unit 130 (power reception unit 210) means a natural frequency at the time when the braking force or the electrical resistance is set at zero in the electric circuit (resonance circuit) forming power transmission unit 130 (power reception unit 210).

Figure 5:
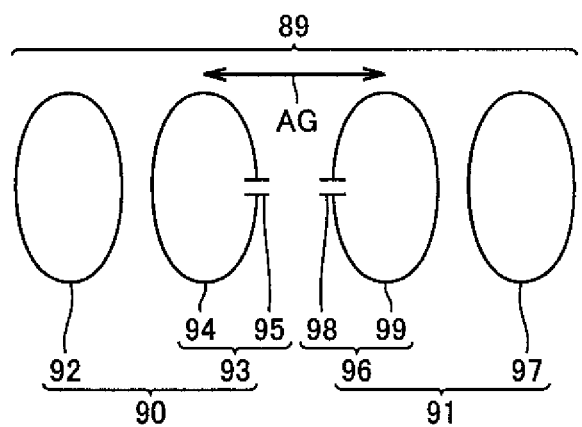
FIG. 5 is a diagram showing a simulation model of the power transfer system.
Figure 6:
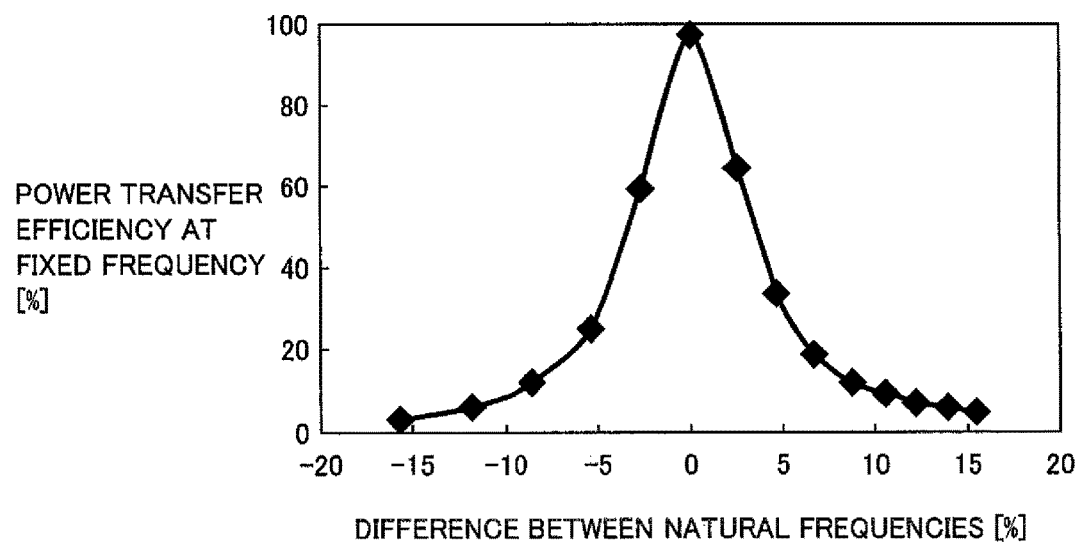
FIG. 6 is a diagram showing the relation between the power transfer efficiency and the difference of natural frequencies between the power transmission unit and the power reception unit.

Referring to FIGS. 5 and 6, the simulation results of analyzing the relation between the power transfer efficiency and the difference between the natural frequencies. FIG. 5 is a diagram showing the simulation model of the power transfer system. FIG. 6 is a diagram showing the relation between the power transfer efficiency and the difference of natural frequencies between the power transmission unit and the power reception unit.

Referring to FIG. 5, a power transfer system 89 includes a power transmission unit 90 and a power reception unit 91. Power transmission unit 90 includes a first coil 92 and a second coil 93. Second coil 93 includes a resonant coil 94 and a capacitor 95 provided in resonant coil 94. Power reception unit 91 includes a third coil 96 and a fourth coil 97. Third coil 96 includes a resonant coil 99 and a capacitor 98 connected to this resonant coil 99.

The inductance of resonant coil 94 is defined as an inductance Lt while the capacitance of capacitor 95 is defined as a capacitance C1. Furthermore, the inductance of resonant coil 99 is defined as an inductance Lr while the capacitance of capacitor 98 is defined as a capacitance C2. When each parameter is set in this way, a natural frequency f1 of second coil 93 is as represented by the following equation (1), and a natural frequency f2 of third coil 96 is as represented by the following equation (2).

$$f1 = 1/\{2\pi(Lt \times C1)^{1/2}\} \quad (1)$$

$$f2 = 1/\{2\pi(Lr \times C2)^{1/2}\} \quad (2)$$

FIG. 6 shows the relation between the power transfer efficiency and the difference of natural frequencies between second coil 93 and third coil 96, in the case where inductance Lr and capacitances C1 and C2 are fixed while only inductance Lt is changed. In this simulation, the relative positional relation between resonant coil 94 and resonant coil 99 is fixed, and the frequency of the current supplied to second coil 93 is constant.

In the graph shown in FIG. 6, the horizontal axis shows the difference between natural frequencies (%) while the vertical axis shows the power transfer efficiency at a fixed frequency (%). The difference between natural frequencies (%) is represented by the following equation (3).

$$(\text{Difference between natural frequencies}) = \{(f1-f2)/f2\} \times 100\% \quad (3)$$

As can be apparent also from FIG. 6, when the difference between natural frequencies (%) is 0%, the power transfer efficiency reaches near 100%. When the difference between natural frequencies (%) is ±5%, the power transfer efficiency is approximately 40%. When the difference between natural frequencies (%) is ±10%, the power transfer efficiency is approximately 10%. When the difference between natural frequencies (%) is ±15%, the power transfer efficiency is approximately 5%. In other words, it can be found that the power transfer efficiency can be improved to a practical level by setting the natural frequencies of second coil 93 and third coil 96 such that the absolute value of the difference between natural frequencies (%) (the difference between natural frequencies) falls within a range equal to or less than 10% of the natural frequency of third coil 96. Furthermore, it is more preferable that the natural frequencies of second coil 93 and third coil 96 are set such that the absolute value of the difference between natural frequencies (%) is equal to or less than 5% of the natural frequency of third coil 96 since this allows further improvement in power transfer efficiency. It is to be noted that electromagnetic field analysis software (JMAG (registered trademark): manufactured by JSOL Corporation) is employed as simulation software.

Again referring to FIG. 1, power transmission unit 130 and power reception unit 210 transmit and receive electric power to and from each other in a contactless manner through at least one of a magnetic field formed between power transmission unit 130 and power reception unit 210 and oscillating at a specific frequency, and an electric field formed between power transmission unit 130 and power reception unit 210 and oscillating at a specific frequency. Coupling coefficient K between power transmission unit 130 and power reception unit 210 is equal to or less than 0.1. Thus, when power transmission unit 130 and power reception unit 210 are resonated by the electromagnetic field, electric power is transferred from power transmission unit 130 to power reception unit 210.

As described above, in this power transfer system, power transmission unit 130 and power reception unit 210 are resonated by an electromagnetic field, thereby transferring electric power between power transmission unit 130 and power reception unit 210 in a contactless manner. Such coupling between power transmission unit 130 and power reception unit 210 during power transfer is for example referred to as "magnetic resonance coupling", "magnetic field resonance coupling", "electromagnetic field resonance coupling", "electric field resonance coupling", and the like. "Electromagnetic field resonance coupling" means coupling including each of "magnetic resonance coupling" "magnetic field resonance coupling" and "electric field resonance coupling".

When power transmission unit 130 and power reception unit 210 each are formed of a coil as described above, power transmission unit 130 and power reception unit 210 are coupled mainly by a magnetic field, to form "magnetic resonance coupling" or "magnetic field resonance coupling". In addition, for example, an antenna such as a meander line can also be employed for power transmission unit 130 and power reception unit 210, in which case power transmission unit 130 and power reception unit 210 are coupled mainly by an electric field to form "electric field resonance coupling".

Figure 7:
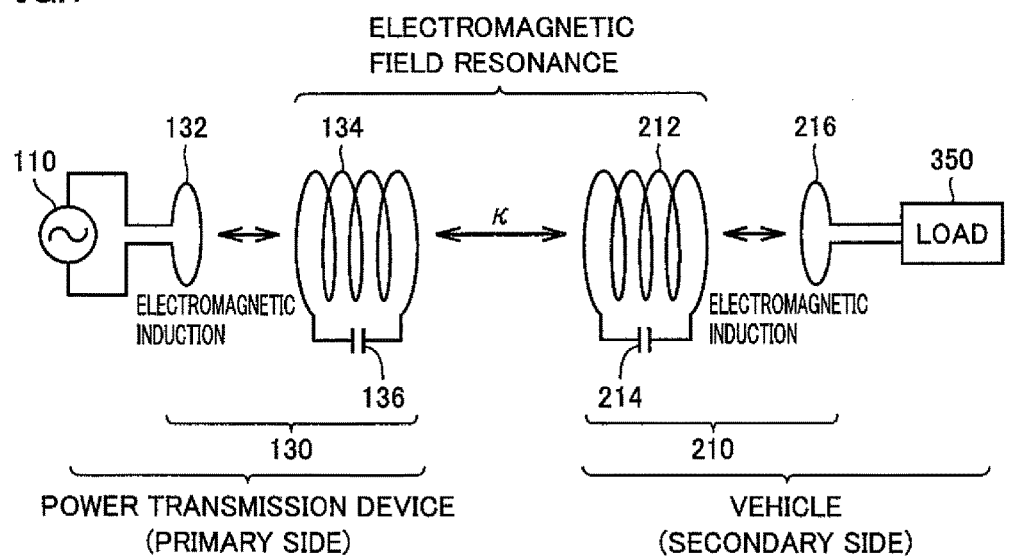
FIG. 7 is an equivalent circuit diagram at the time when electric power is transferred from a power transmission device to the vehicle.

FIG. 7 is an equivalent circuit diagram at the time when electric power is transferred from power transmission device 100 to vehicle 200. Referring to FIG. 7, power transmission unit 130 of power transmission device 100 includes an electromagnetic induction coil 132, a resonant coil 134 and a capacitor 136.

Electromagnetic induction coil 132 is disposed approximately coaxially with resonant coil 134 at a prescribed distance from this resonant coil 134. Electromagnetic induction coil 132 is magnetically coupled to resonant coil 134 by means of electromagnetic induction, and supplies high-frequency electric power, which is supplied from power supply unit 110, to resonant coil 134 by means of electromagnetic induction.

Resonant coil 134 forms an LC resonance circuit together with capacitor 136. In addition, an LC resonance circuit is formed also in power reception unit 210 of vehicle 200, as described later. The difference between the natural frequency of the LC resonance circuit formed by resonant coil 134 and capacitor 136, and the natural frequency of the LC resonance circuit of power reception unit 210 is equal to or less than ±10% of the natural frequency of the former circuit or the natural frequency of the latter circuit. Also, resonant coil 134 receives electric power from electromagnetic induction coil 132 by means of electromagnetic induction, and transmits electric power to power reception unit 210 of vehicle 200 in a contactless manner. In addition, electromagnetic induction coil 132 is provided for facilitating power feeding from power supply unit 110 to resonant coil 134. Thus, power supply unit 110 may be directly connected to resonant coil 134 without providing electromagnetic induction coil 132. Furthermore, capacitor 136 is provided for adjusting the natural frequency of the resonance circuit. Thus, capacitor 136 does not have to be provided in the case where a desired natural frequency can be obtained utilizing the stray capacitance of resonant coil 134.

Furthermore, power reception unit 210 of vehicle 200 also includes a resonant coil 212, a capacitor 214 and an electromagnetic induction coil 216. Resonant coil 212 forms an LC resonance circuit together with capacitor 214. As described above, the difference between the natural frequency of the LC resonance circuit formed of resonant coil 212 and capacitor 214, and the natural frequency of the LC resonance circuit formed of resonant coil 134 and capacitor 136 in power transmission unit 130 of power transmission device 100 is ±10% of the natural frequency of the former circuit or the natural frequency of the latter circuit. Then, resonant coil 212 receives electric power from power transmission unit 130 of power transmission device 100 in a contactless manner.

Electromagnetic induction coil 216 is disposed approximately coaxially with resonant coil 212 at a prescribed distance from this resonant coil 212. Electromagnetic induction coil 216 magnetically couples to resonant coil 212 by means of electromagnetic induction, extracts the electric power received by resonant coil 212 by means of electromagnetic induction, and outputs the electric power to an electric load 350 (power storage device 270) connected subsequent to rectifier 220 (FIG. 1).

In addition, electromagnetic induction coil 216 is provided for facilitating extraction of electric power from resonant coil 212. Thus, rectifier 220 may be directly connected to resonant coil 212 without providing electromagnetic induction coil 216. Furthermore, capacitor 214 is provided for adjusting the natural frequency of the resonance circuit. Thus, capacitor 214 does not have to be provided when a desired natural frequency is obtained utilizing the stray capacitance of resonant coil 212.

In power transmission device 100, high-frequency AC power is supplied from power supply unit 110 to electromagnetic induction coil 132, and electric power is supplied to resonant coil 134 using electromagnetic induction coil 132. This causes energy (electric power) to move from resonant coil 134 to resonant coil 212 through the magnetic field formed between resonant coil 134 and resonant coil 212 of vehicle 200. The energy (electric power) having moved to resonant coil 212 is extracted using electromagnetic induction coil 216, and transferred to electric load 350 of vehicle 200.

Figure 8:
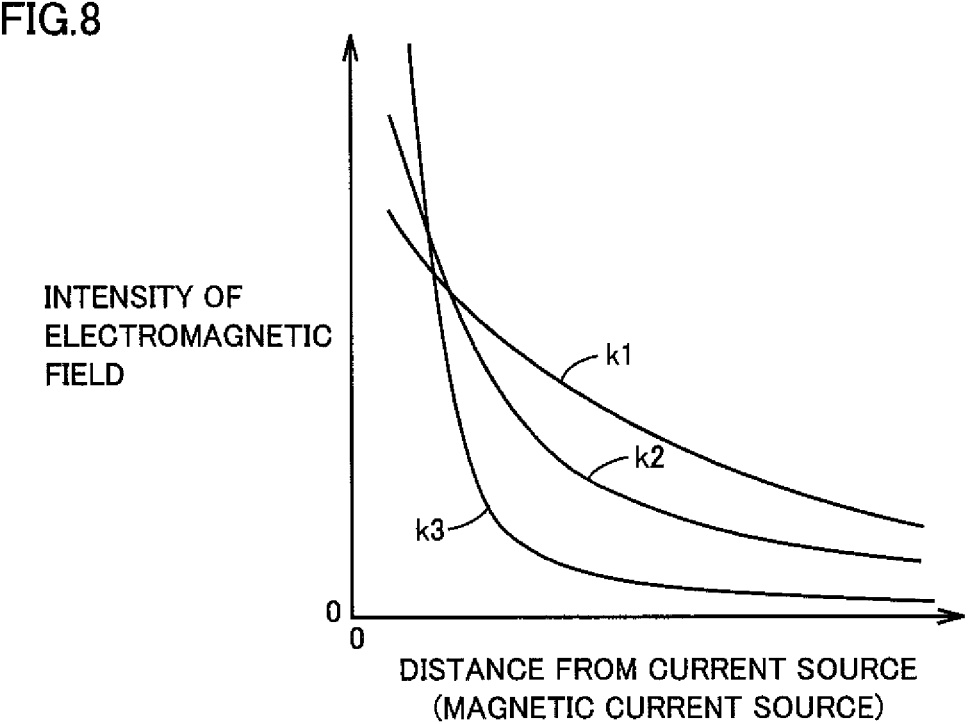
FIG. 8 is a diagram showing the relation between the distance from a current source (magnetic current source) and the intensity of an electromagnetic field.

FIG. 8 is a diagram showing the relation between the distance from a current source (magnetic current source) and the intensity of the electromagnetic field. Referring to FIG. 8, the electromagnetic field includes three components. Curve k1 represents a component inversely proportional to the distance from a wave source, and is referred to as a "radiation electromagnetic field". Curve k2 represents a component inversely proportional to the square of the distance from the wave source, and is referred to as an "induction electromagnetic field". Curve k3 represents a component inversely proportional to the cube of the distance from the wave source, and is referred to as a "static electromagnetic field".

The "static electromagnetic field" is a region where the intensity of the electromagnetic wave sharply decreases in accordance with the distance from the wave source. The resonance method uses the near field (evanescent field) where this "static electromagnetic field" is dominant, to transfer energy (electric power). Specifically, in the near field where the "static electromagnetic field" is dominant, a pair of resonators (for example, a pair of resonant coils) having natural frequencies close to each other are resonated, thereby transferring energy (electric power) from one resonator (primary resonant coil) to the other resonator (secondary resonant coil). This "static electromagnetic field" does not propagate energy to a distant location. Therefore, as compared with an electromagnetic wave transferring energy (electric power) by the "radiation electromagnetic field" propagating energy to a distant location, the resonance method allows electric power transmission with a relatively small energy loss.

As described above, in the first embodiment, cooling fan 240 for cooling power reception unit 210 is electrically connected to power line 230 through which the electric power rectified by rectifier 220 is output, and operates with the electric power received from power line 230. Accordingly, it is suppressed that the harmonic of the electric power received by power reception unit 210 is propagated from cooling fan 240 to auxiliary machinery power supply 310. Therefore, according to the first embodiment, in vehicle 200 receiving electric power from power transmission device 100 in a contactless manner, it can be suppressed that noise generated by the electric power received from power transmission device 100 exerts an influence upon other devices.

As a result, it becomes possible to eliminate the need for countermeasures against noise in other devices as described above.

Furthermore, in the first embodiment, DC/DC converter 260 is provided between power line 230 and power storage device 270, and voltage VH on power line 230 is adjusted at a higher value as the electric power received by power reception unit 210 is larger. Cooling fan 240 is electrically connected to power line 230. Accordingly, the larger the electric power received by power reception unit 210 is, the more the power of cooling fan 240 automatically increases. In other words, the power of cooling fan 240 changes independently in accordance with the magnitude of the electric power transferred from power transmission device 100 to vehicle 200. Therefore, according to this first embodiment, power reception unit 210 can be effectively cooled by cooling fan 240 without having to provide special control and mechanism for adjusting the power of cooling fan 240. Also when the received electric power is relatively large and the heat amount generated in power reception unit 210 is relatively large, power reception unit 210 can be sufficiently cooled.

Furthermore, in this first embodiment, since cooling fan 240 is electrically connected to power line 230 in shield box 250, the power supply line of cooling fan 240 does not have to be pulled out to the outside of shield box 250. Therefore, according to this first embodiment, it becomes possible to construct a cooling mechanism that operates independently only within shield box 250.

Second Embodiment

The second embodiment shows a configuration in which a DC/DC converter is not provided between power line 230 and power storage device 270.

Figure 9:
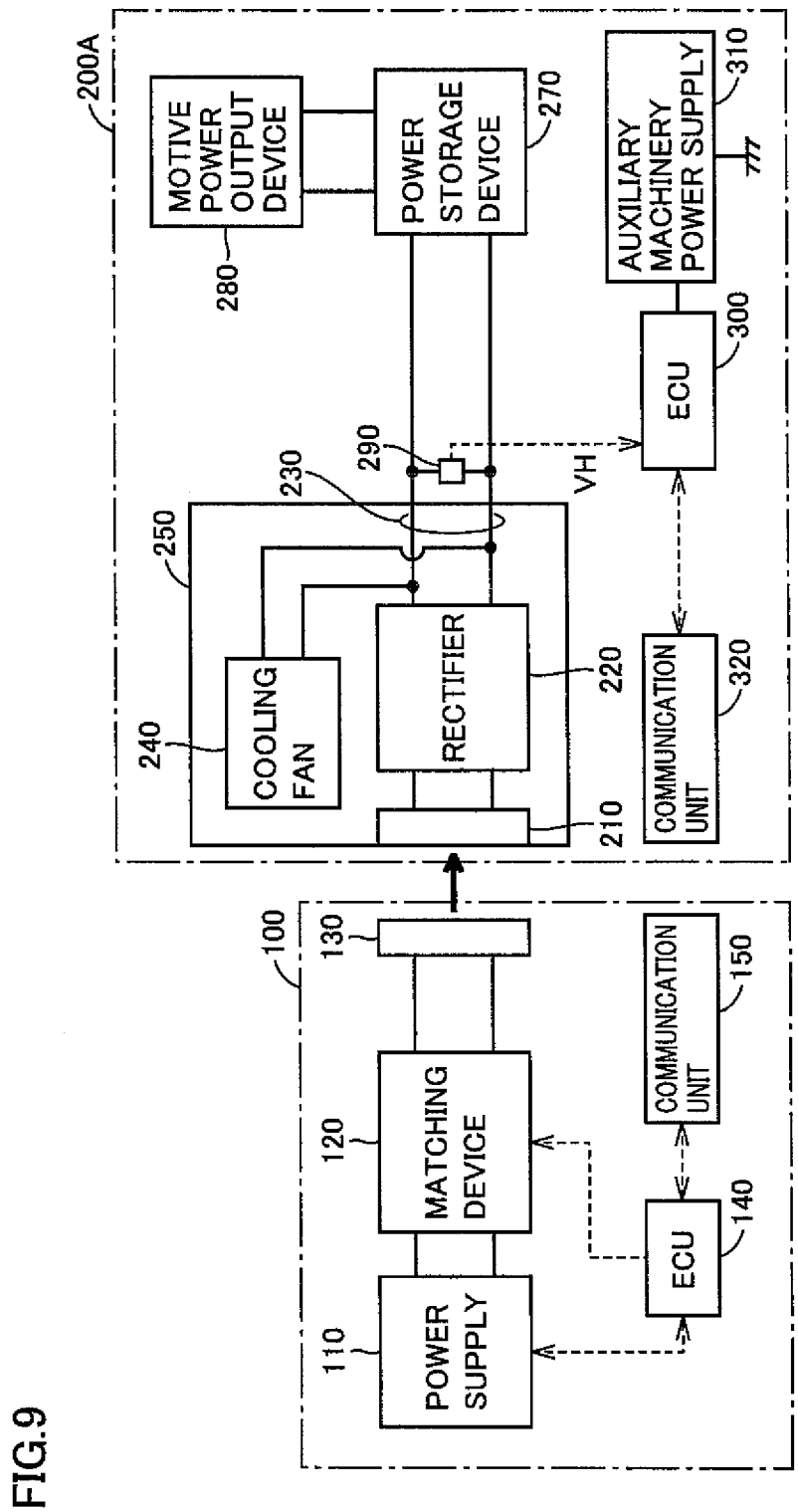
FIG. 9 is an entire configuration diagram of a power transfer system according to the second embodiment.

FIG. 9 is an entire configuration diagram of a power transfer system according to the second embodiment. Referring to FIG. 9, this power transfer system has a configuration of the power transfer system according to the first embodiment shown in FIG. 1, in which a vehicle 200A not including DC/DC converter 260 is provided in place of vehicle 200. In other words, power storage device 270 is connected to power line 230.

As to other configurations including a configuration in which cooling fan 240 is electrically connected to power line 230, vehicle 200A is the same as vehicle 200 in the first embodiment.

Figure 10:
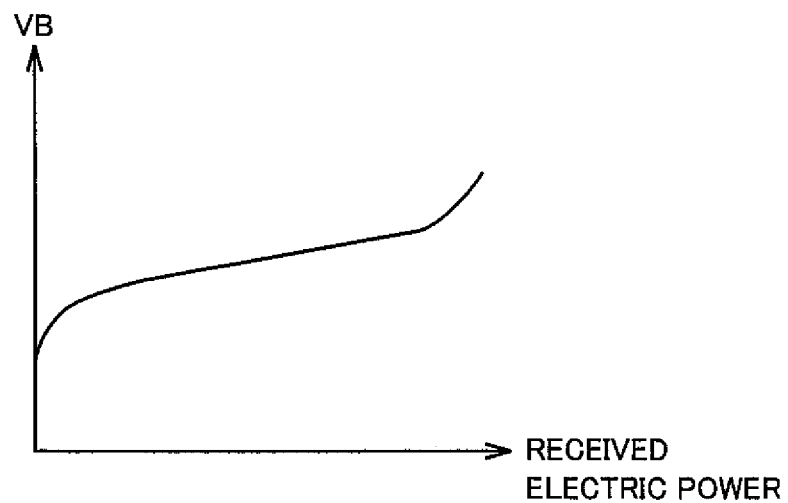
FIG. 10 is a diagram showing the relation between the electric power received by the power reception unit and the voltage of a power storage device.
Figure 11:
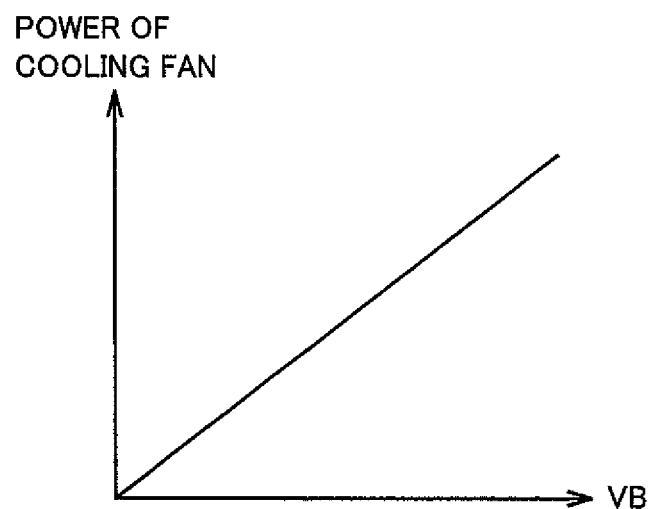
FIG. 11 is a diagram showing the relation between the voltage of the power storage device and the power of the cooling fan.

FIG. 10 is a diagram showing the relation between the electric power received by power reception unit 210 and voltage VB of power storage device 270. Furthermore, FIG. 11 is a diagram showing the relation between voltage VB of power storage device 270 and the power of cooling fan 240.

Referring to FIG. 10, the larger the electric power received by power reception unit 210 is, the higher the voltage VB of power storage device 270 is raised due to an influence of the internal resistance of power storage device 270. Then, referring to FIG. 11, the higher voltage VB of power storage device 270 is, the higher voltage VH on power line 230 is, with the result that the power of cooling fan 240 is also increased.

In other words, also in the power transfer system in which a DC/DC converter is not provided, the larger the electric power received by power reception unit 210 is, the larger the power of cooling fan 240 cooling power reception unit 210 is.

As described above, also in this second embodiment, the power of cooling fan 240 changes independently in accordance with the magnitude of the electric power transferred from power transmission device 100 to vehicle 200A. Therefore, also according to the second embodiment, power reception unit 210 can be effectively cooled by cooling fan 240 without having to provide special control and mechanism for adjusting the power of cooling fan 240.

[Modification]

In the above-described first and second embodiments, cooling fan 240 is electrically connected to power line 230 through which the received electric power rectified by rectifier 220 is output, but this cooling fan 240 may be connected to the power line between power reception unit 210 and rectifier 220.

Figure 12:
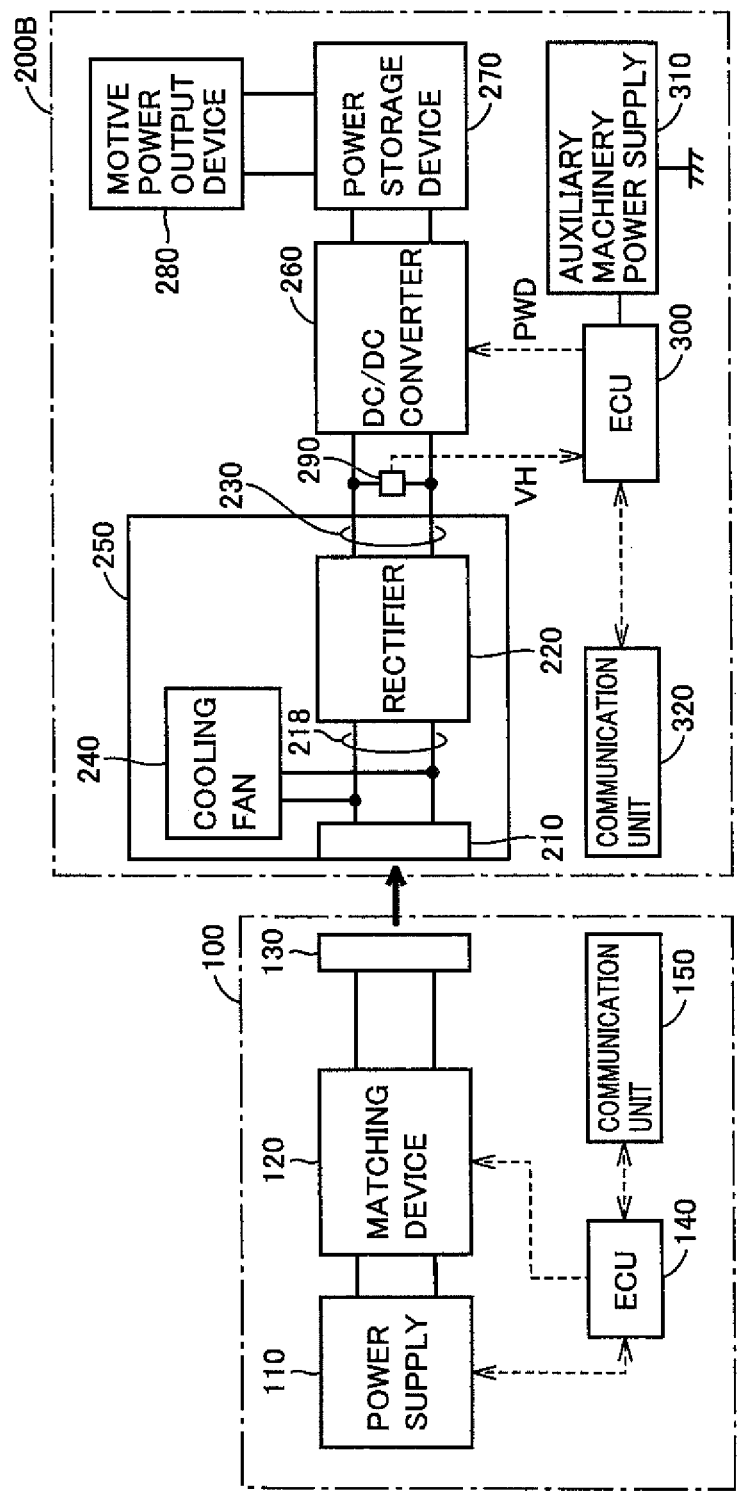
FIG. 12 is an entire configuration diagram of a power transfer system according to a modification.

FIG. 12 is an entire configuration diagram of a power transfer system according to a modification of the first embodiment. Referring to FIG. 12, in a vehicle 200B of this power transfer system, cooling fan 240 is electrically connected to a power line 218 between power reception unit 210 and rectifier 220, and operates with the electric power received from power line 218. It is to be noted that other configurations of vehicle 200B are the same as those of vehicle 200 in the first embodiment shown in FIG. 1.

Although not particularly shown, in the configuration of vehicle 200A in the second embodiment shown in FIG. 9, cooling fan 240 may be electrically connected to the power line between power reception unit 210 and rectifier 220.

Third Embodiment

Although a description has been given in the above-described first and second embodiments and the modification with regard to the case where the "electrical device" in the present invention is cooling fan 240, the "electrical device" is not limited to cooling fan 240.

Figure 13:
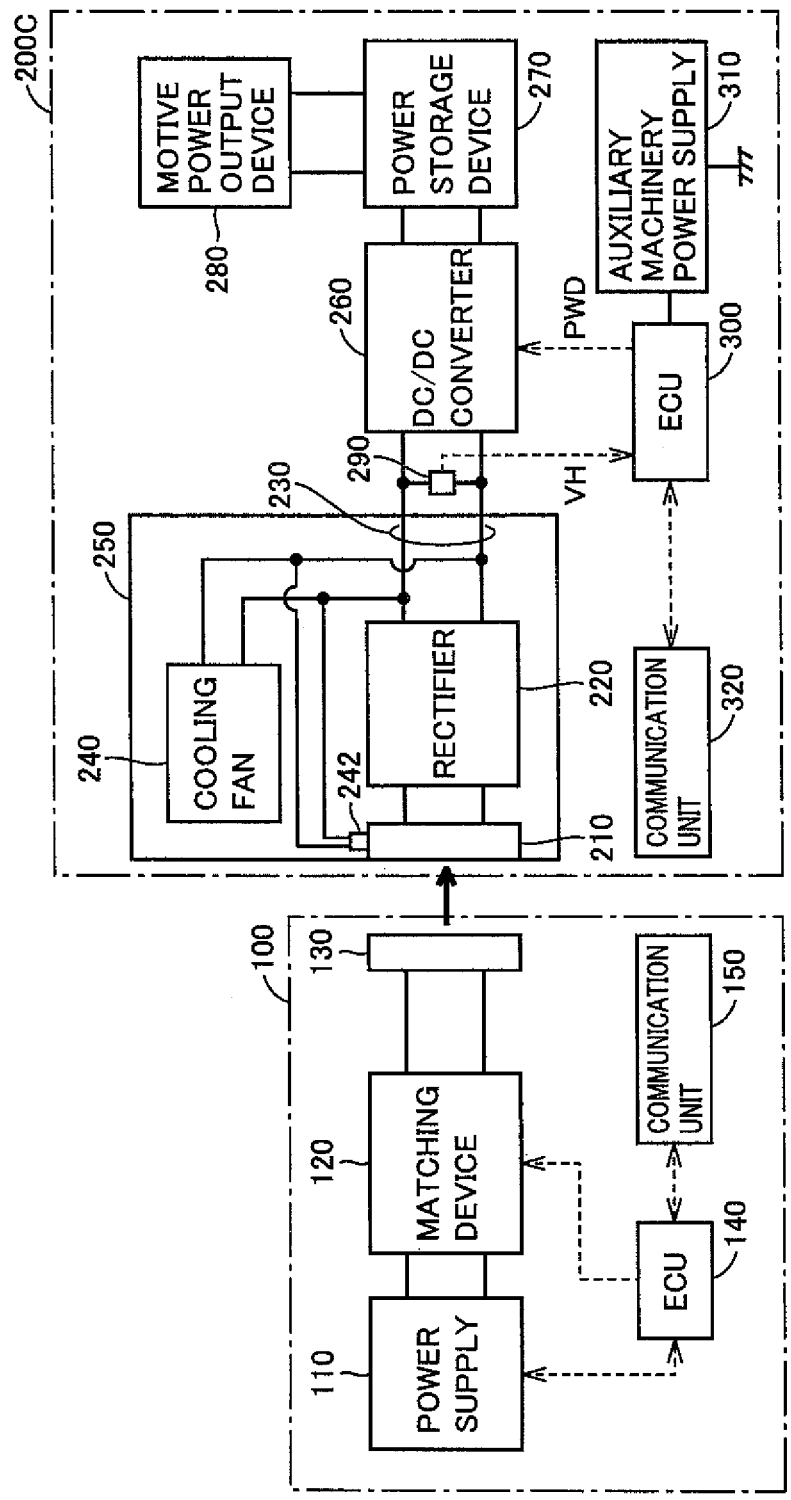
FIG. 13 is an entire configuration diagram of a power transfer system according to the third embodiment.

FIG. 13 is an entire configuration diagram of a power transfer system according to the third embodiment. Referring to FIG. 13, a vehicle 200C of this power transfer system further includes a temperature sensor 242 in the configuration of vehicle 200 in the first embodiment shown in FIG. 1.

Temperature sensor 242 is disposed in proximity to power reception unit 210, detects the temperature of power reception unit 210, and outputs the detected temperature to ECU 300. This temperature sensor 242 is also provided within shield box 250. Furthermore, temperature sensor 242 is electrically connected to power line 230 through which the electric power received by power reception unit 210 is output, and operates with the electric power received from power line 230.

It is to be noted that other configurations of vehicle 200C are the same as those of vehicle 200 in the first embodiment shown in FIG. 1.

In addition, a modification of this third embodiment may be a vehicle not provided with cooling fan 240 and DC/DC converter 260.

Also in this third embodiment, since temperature sensor 242 disposed in proximity to power reception unit 210 operates with the electric power received from power line 230, it is suppressed that the harmonic of the electric power received by power reception unit 210 is propagated from temperature sensor 242 to auxiliary machinery power supply 310. Therefore, also according to this third embodiment, it can be suppressed that noise generated by the electric power received from power transmission device 100 exerts an influence upon other devices.

Fourth Embodiment

The fourth embodiment shows the case where an "electrical device" disposed in proximity to the power reception unit serves as an adjustment device of a variable capacitor for adjusting the natural frequency of the power reception unit.

Figure 14:
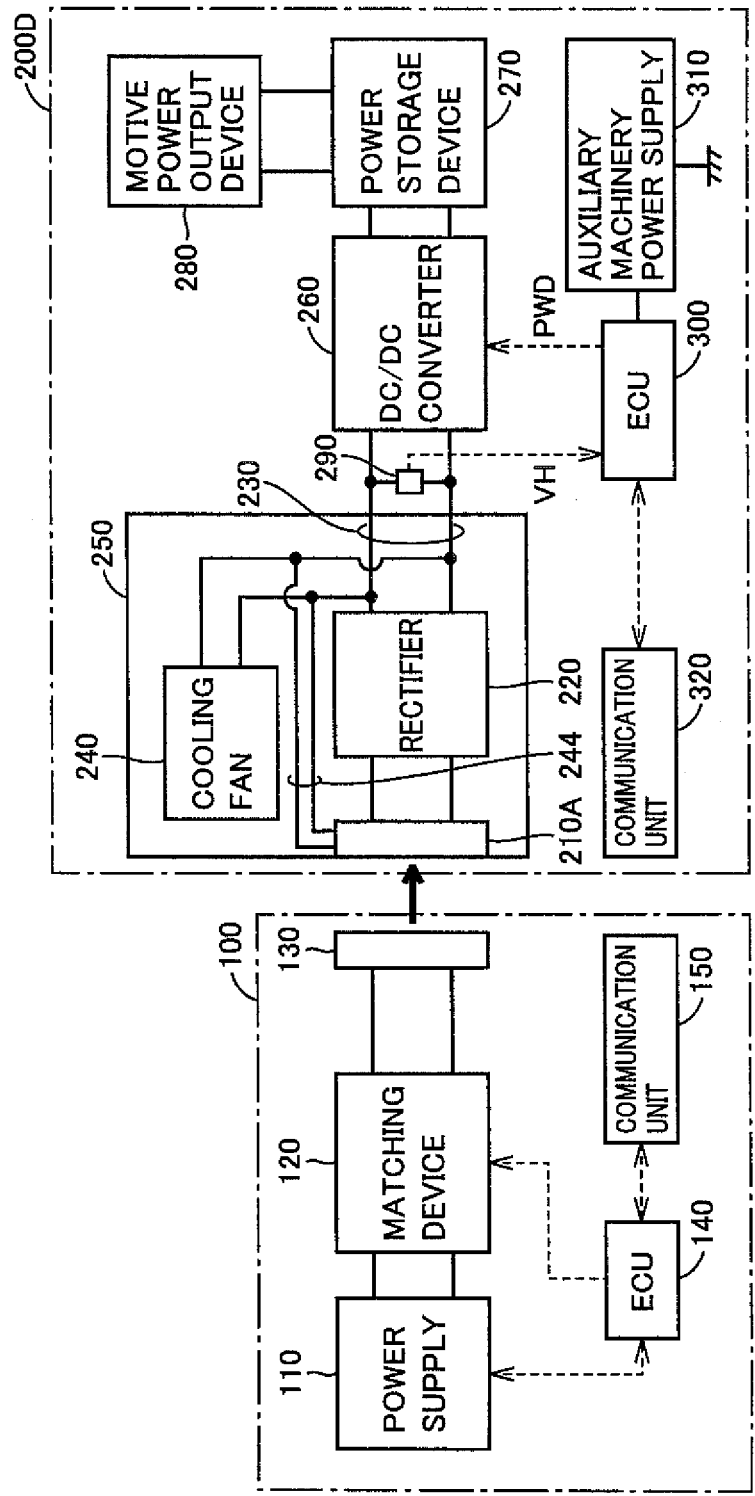
FIG. 14 is an entire configuration diagram of a power transfer system according to the fourth embodiment.

FIG. 14 is an entire configuration diagram of a power transfer system according to the fourth embodiment. Referring to FIG. 14, a vehicle 200D of this power transfer system has a configuration of vehicle 200 in the first embodiment shown in FIG. 1, in which a power reception unit 210A is provided in place of power reception unit 210.

Power reception unit 210A includes a variable capacitor and its adjustment device that are not shown. Also, the adjustment device of the variable capacitor is electrically connected through a power line 244 to power line 230 through which the electric power received by power reception unit 210A is output, and operates with the electric power received from power line 230.

Figure 15:
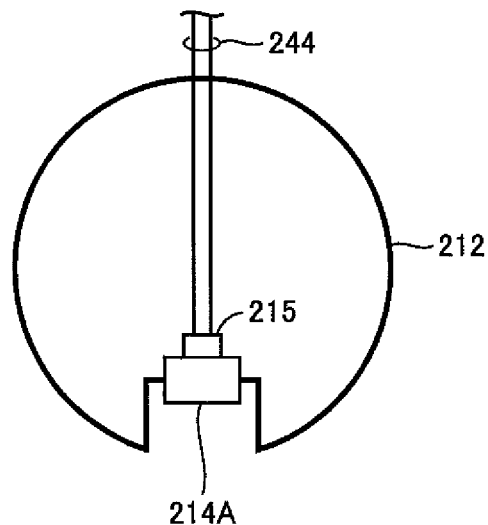
FIG. 15 is a diagram showing the configuration of the power reception unit shown in FIG. 14.

FIG. 15 is a schematic configuration diagram showing power reception unit 210A shown in FIG. 14. Referring to FIG. 15, power reception unit 210A includes a resonant coil 212, a variable capacitor 214A, an adjustment device 215, and an electromagnetic induction coil 216 that is not shown.

Variable capacitor 214A is connected between both ends of resonant coil 212, and forms a resonance circuit together with resonant coil 212. The capacitance of variable capacitor 214A is adjusted by adjustment device 215. The natural frequency of power reception unit 210A can be changed by changing the capacitance of variable capacitor 214A.

Adjustment device 215 serves as an electrical device for adjusting the capacitance of variable capacitor 214A, and adjusts the capacitance of variable capacitor 214A according to a command from ECU 300 that is not shown. Adjustment device 215 is also provided within shield box 250 (FIG. 14) together with resonant coil 212 and variable capacitor 214A. Furthermore, adjustment device 215 is electrically connected to power line 230 (FIG. 14) through power line 244, and operates with the electric power received from power line 230.

It is to be noted that other configurations of vehicle 200D are the same as those of vehicle 200 in the first embodiment shown in FIG. 1.

In addition, the modification of this fourth embodiment may be a vehicle not provided with cooling fan 240 and DC/DC converter 260, or may be a vehicle further provided with a temperature sensor 242 in the third embodiment.

Also in this fourth embodiment, adjustment device 215 of variable capacitor 214A disposed in proximity to power reception unit 210A operates with the electric power received from power line 230. Accordingly, it is suppressed that the harmonic of the electric power received by power reception unit 210 is propagated from adjustment device 215 to auxiliary machinery power supply 310. Therefore, also according to this fourth embodiment, it can be suppressed that noise generated by the electric power received from power transmission device 100 exerts an influence upon other devices.

In each of the above-described embodiments, power transmission unit 130 of power transmission device 100 (on the primary side) and power reception unit 210 of vehicles 200, 200A (the secondary side) are resonated by the electromagnetic field, thereby transferring the electric power from power transmission unit 130 to power reception unit 210 in a contactless manner. However, the present invention is applicable also to such a system as transferring electric power from power transmission unit 130 to power reception unit 210 in a contactless manner by means of electromagnetic induction.

Figure 16:
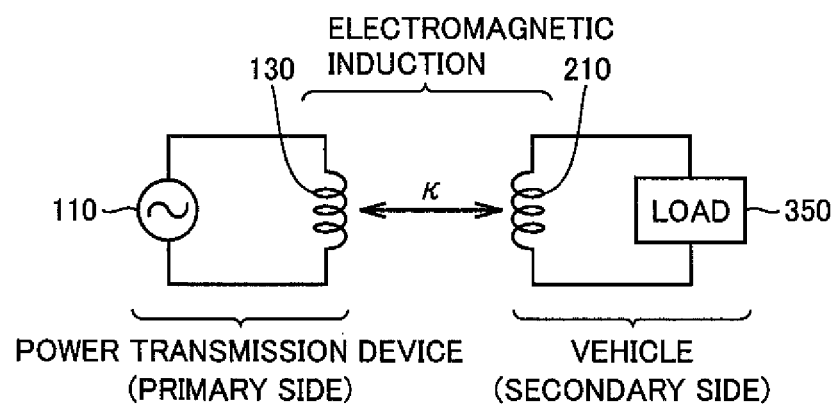
FIG. 16 is an equivalent circuit diagram at the time when electric power is transferred from the power transmission unit to the power reception unit by means of electromagnetic induction.

FIG. 16 is an equivalent circuit diagram at the time when electric power is transferred from power transmission unit 130 to power reception unit 210 by means of electromagnetic induction. Referring to FIG. 16, each of power transmission unit 130 of power transmission device 100 and power reception unit 210 of vehicles 200, 200A is formed of an electromagnetic induction coil.

In power transmission device 100, high-frequency AC power output from power supply unit 110 is supplied to the electromagnetic induction coil of power transmission unit 130. This causes generation of electromotive force by means of electromagnetic induction in the electromagnetic induction coil of power reception unit 210 disposed in proximity to power transmission unit 130, and energy (electric power) is moved from the electromagnetic induction coil of power transmission unit 130 to the electromagnetic induction coil of power reception unit 210. Then, the energy (electric power) moved to power reception unit 210 is output to electric load 350 connected subsequent to rectifier 220.

When power transfer is carried out between power transmission unit 130 and power reception unit 210 by means of electromagnetic induction, coupling coefficient between the electromagnetic induction coil of power transmission unit 130 and the electromagnetic induction coil of power reception unit 210 becomes a value close to 1.0.

In each of the above-described embodiments, the cooler for cooling power reception unit 210 is formed by cooling fan 240, but not limited thereto. For example, a thermoelectric conversion element such as a Peltier device can also be used as a cooler.

Furthermore, although cooling fan 240, temperature sensor 242 and adjustment device 215 of variable capacitor 214A are defined as electrical devices disposed in proximity to power reception unit 210 in the above-described embodiments, these electrical devices are not limited thereto, but may include for example other various sensors (a voltage sensor, a current sensor and the like), an indicator indicating that power reception unit 210 (210A) is receiving electric power, and the like, which are provided within shield box 250.

In the case where the "electrical device" is a cooler (cooling fan 240) cooling the power reception unit, the cooler is used mainly while power reception unit 210 (210A) receives electric power. Accordingly, the present invention is effective. Furthermore, in the case where the "electrical device" is used only while power reception unit 210 (210A) receives electric power, the present invention is effective. In this case, such electrical devices may include an indicator indicating that power reception unit 210 (210A) is receiving electric power, a cooler cooling the power reception unit, and the like.

Furthermore, while each of the above-described embodiments shows the case where electric power is transferred from power transmission device 100 to vehicle 200 (200A to 200D), the present invention can be applied also to a power transfer system including a power reception device other than a vehicle.

In the above description, each of cooling fan 240, temperature sensor 242 and adjustment device 215 of variable capacitor 214A corresponds to an embodiment of the "electrical device" in the present invention, and cooling fan 240 corresponds to an embodiment of the "cooler" in the present invention. Furthermore, DC/DC converter 260 corresponds to an embodiment of the "voltage conversion unit" in the present invention, and ECU 300 corresponds to an embodiment of the "voltage control unit" in the present invention.

It should be construed that embodiments disclosed herein are by way of illustration in all respects, not by way of limitation. The scope of the present invention is defined by the terms of the claims, rather than the description of the embodiments provided above, and is intended to include any modifications within the meaning and scope equivalent to the terms of the claims.

REFERENCE SIGNS LIST 100 power transmission device, 110 power supply unit, 120 matching device, 130 power transmission unit, 132, 216 electromagnetic induction coil, 134, 212 resonant coil, 136, 214 capacitor, 140, 300 ECU, 150, 320 communication unit, 200, 200A to 200D vehicle, 210 power reception unit, 214A variable capacitor, 218, 230, 244 power line, 220 rectifier, 240 cooling fan, 242 temperature sensor, 250 shield box, 260 DC/DC converter, 270 power storage device, 280 motive power output device, 290 voltage sensor, 310 auxiliary machinery power supply, 350 electric load, 410 target voltage setting unit, 420 DC/DC converter control unit.

The invention claimed is:

1. A power reception device mounted on a vehicle and configured to receive electric power from a power transmission device in a contactless manner, said power reception device comprising:
   a power reception unit configured to receive, in a contactless manner, AC power output from a power transmission unit of said power transmission device;
   a power storage device configured to store electric power used for generating driving force of said vehicle;
   a power line through which the electric power received by said power reception unit is output to said power storage device;
   an electrical device configured to operate with the electric power received from said power line; and
   a shield box configured to house said power reception unit and said electrical device, said shield box being different from a vehicle body of said vehicle, wherein
   said electrical device is electrically connected to said power line within said shield box.

2. The power reception device according to claim 1, further comprising:
   a rectification unit housed within said shield box, and configured to rectify the electric power received by said power reception unit; and
   a voltage conversion unit configured to perform voltage conversion of the electric power rectified by said rectification unit, and configured to output the electric power to a load, wherein
   said electrical device is electrically connected between said rectification unit and said voltage conversion unit.

3. A vehicle comprising the power reception device according to claim 2.

4. The power reception device according to claim 2, wherein
   said electrical device includes a cooler configured to cool said power reception unit, and
   said power reception device further comprises a voltage control unit configured to control said voltage conversion unit such that a voltage between said rectification unit and said voltage conversion unit is equal to a target voltage that is set to be higher as the electric power received by said power reception unit is larger.

5. A vehicle comprising the power reception device according to claim 4.

6. The power reception device according to claim 1, further comprising
   a rectification unit configured to rectify the electric power received by said power reception unit, wherein
   said electrical device is electrically connected between said power reception unit and said rectification unit.

7. A vehicle comprising the power reception device according to claim 6.

8. The power reception device according to claim 1, wherein
   a difference between a natural frequency of said power reception unit and a natural frequency of said power transmission unit is equal to or less than ±10% of the natural frequency of said power reception unit or the natural frequency of said power transmission unit.

9. A vehicle comprising the power reception device according to claim 8.

10. The power reception device according to claim 1, wherein
    a coupling coefficient between said power reception unit and said power transmission unit is equal to or less than 0.1.

11. A vehicle comprising the power reception device according to claim 10.

12. The power reception device according to claim 1, wherein
    said power reception unit receives electric power from said power transmission unit through at least one of a magnetic field formed between said power reception unit and said power transmission unit and oscillating at a specific frequency, and an electric field formed between said power reception unit and said power transmission unit and oscillating at a specific frequency.

13. A vehicle comprising the power reception device according to claim 12.

14. A vehicle comprising the power reception device according to claim 1.

15. The power reception device according to claim 1, wherein
    said power storage device is disposed inside said vehicle body and outside said shield box.

16. A power transfer system configured to transfer electric power in a contactless manner from a power transmission device to a power reception device mounted on a vehicle, said power transmission device comprising:
    a power supply unit configured to generate AC power; and
    a power transmission unit configured to output the AC power to said power reception device in a contactless manner, said AC power being supplied from said power supply unit, and
   said power reception device comprising:
    a power reception unit configured to receive, in a contactless manner, the AC power output from said power transmission unit;
    a power storage device configured to store electric power used for generating driving force of said vehicle;
    a power line through which the electric power received by said power reception unit is output to said power storage device;
    an electrical device configured to operate with the electric power received from said power line; and a shield box configured to house said power reception unit and said electrical device, said shield box being different from a vehicle body of said vehicle, wherein said electrical device is electrically connected to said power line within said shield box.

17. The power transfer system according to claim 16, wherein said power storage device is disposed inside said vehicle body and outside said shield box.

* * * * *